(12) United States Patent
You et al.

(10) Patent No.: US 9,489,592 B2
(45) Date of Patent: Nov. 8, 2016

(54) USER CHARACTERISTIC PREDICTION USING IMAGES POSTED IN ONLINE SOCIAL NETWORKS

(71) Applicant: Xerox Corporation, Norwalk, CT (US)

(72) Inventors: Quanzeng You, Rochester, NY (US); Sumit Bhatia, San Jose, CA (US)

(73) Assignee: Xerox Corporation, Norwalk, CT (US)

( * ) Notice: Subject to any disclaimer, the term of this patent is extended or adjusted under 35 U.S.C. 154(b) by 34 days.

(21) Appl. No.: 14/561,895

(22) Filed: Dec. 5, 2014

(65) Prior Publication Data

US 2016/0162751 A1   Jun. 9, 2016

(51) Int. Cl.
*G06K 9/66* (2006.01)
*G06K 9/46* (2006.01)
*G06K 9/00* (2006.01)

(52) U.S. Cl.
CPC ......... *G06K 9/4676* (2013.01); *G06K 9/00677* (2013.01); *G06T 2207/10004* (2013.01)

(58) Field of Classification Search
CPC ...... G06K 9/4671; G06K 9/481; G06K 9/48; G06K 9/6206; G06T 2207/10004; G06T 7/0083; G06T 7/0085
USPC ....... 382/219, 197, 181, 172, 173, 190, 220, 382/130, 236, 312, 305, 307; 705/14.66, 705/14.53; 707/748; 455/418; 706/55; 709/204, 203
See application file for complete search history.

(56) References Cited

U.S. PATENT DOCUMENTS 6,711,293 B1 *   3/2004   Lowe ................... G06K 9/4671
                                              382/219

8,495,143 B2 *   7/2013   Zhou ...................... G06Q 10/10
                                              705/14.66
8,583,471 B1     11/2013  Voskuhl et al.
8,874,144 B1 *   10/2014  Liu ......................... H04W 4/02
                                              455/456.1

(Continued)

FOREIGN PATENT DOCUMENTS

CN          103164470         6/2013

OTHER PUBLICATIONS

Quanzeng You et al., "The eyes of the beholder: Gender prediction using images posted in Online Social Networks", IEEE International Conference on Data Mining, Workshop on Social Multimedia Data Mining, Shenzhen, China, Dec. 14-17, 2014, pp. 1-5.

(Continued)

*Primary Examiner* — Sheela C Chawan
(74) *Attorney, Agent, or Firm* — Gibb & Riley, LLC

(57) ABSTRACT

Methods and systems provide electronic instructions to a non-transitory electronic storage hardware device to record images uploaded by a user over a computerized network to a social networking site, and to record categories of network site locations to which the images are uploaded by the user. These methods and systems also provide electronic instructions to a computerized electronic image processor hardware device to analyze features within the images to identify content of each of the images, and to determine the user characteristics based on the categories of network site locations to which the images are uploaded by the user and on the content of the images uploaded by the user. Also, such methods and systems provide electronic instructions to the computerized electronic image processor hardware device to output the user characteristics on a graphic user interface hardware device.

18 Claims, 4 Drawing Sheets

(56) References Cited

U.S. PATENT DOCUMENTS

| 8,983,948 | B1* | 3/2015 | Haugen | G06F 17/00 706/12 |
|---|---|---|---|---|
| 9,049,076 | B1* | 6/2015 | Ramachandran | H04L 67/22 |
| 2008/0294589 | A1 | 11/2008 | Chu et al. | |
| 2010/0076850 | A1 | 3/2010 | Parekh et al. | |
| 2010/0082360 | A1 | 4/2010 | Chien et al. | |
| 2010/0203876 | A1 | 8/2010 | Krishnaswamy | |
| 2012/0109973 | A1 | 5/2012 | Lin et al. | |

OTHER PUBLICATIONS

Yoram Bachrach et al., "Your Digital Image: Factors Behind Demographic and Psychometric Predictions From Social Network Profiles", pp. 1649-1650, http://aamas2014.lip6.fr/proceedings/aamas/p1649.pdf, Dec. 2014.

* cited by examiner

USER CHARACTERISTIC PREDICTION USING IMAGES POSTED IN ONLINE SOCIAL NETWORKS

BACKGROUND

Systems and methods herein generally relate to automatic identification of features in images using image processor, and more particularly to automatically identifying user characteristics (such as gender, etc.) based on items users upload to image-based network storage sites.

Online Social Networks (OSNs) such as Facebook®, Twitter®, etc., have become immensely popular with three out of every four adult Internet users using at least one social networking site. Such a large scale adoption and active participation of users has led to research efforts studying relationship between users' digital behavior and their demographic attributes such as age, gender, relationship status, etc. Accurate techniques to predict these demographic attributes are useful for marketing purposes, and personalization and recommender systems.

A large scale study of Facebook® users reveals that digital records of human activity can be used to accurately predict a range of personal attributes such as age, gender, preferences, political orientation, etc. Likewise, there have been numerous works that study variations in language used in social media with age, gender, personality, etc. While most of the popular OSNs studied in literature are mostly text based, some of them (e.g., Facebook®, Twitter®) also allow people to post images and videos. Recently, OSNs such as Instagram® and Pinterest® that are majorly image based have gained popularity.

SUMMARY

Presented generally, methods herein record images uploaded by a user to a social networking site and record categories of network site locations to which the images are uploaded by the user. These methods analyze features within the images to identify content of each of the images. With this, these methods determine the user characteristics based on the categories of network site locations to which the images are uploaded by the user, and based on the content of the images uploaded by the user.

More specifically, methods herein provide electronic instructions to a non-transitory electronic storage hardware device to record images uploaded by a user over a computerized network to a social networking site, and to record categories of network site locations to which the images are uploaded by the user. For example, these categories can be determined based on the categories of the social networking boards to which the user uploads the images.

These methods provide electronic instructions to a computerized electronic image processor hardware device to analyze features within the images to identify content of each of the images. Such analyzing of the features within the images generates vectors describing the content of each of the images, and determines the occurrence count of each type of feature in each image to produce such vectors for each image. Thus, the vectors represent the features in the images, and these methods can employ a latent semantic index to discover topics making up a length of each vector. In one example, the analysis of the features within the images determines the visual features for each image by employing scale-invariant feature transform (SIFT) to the images. Also, such analyzing of the features within the images can cluster all such features to define the center of each cluster.

These methods additionally provide electronic instructions to a computerized electronic image processor hardware device to determine the user characteristics based on the categories of network site locations to which the images are uploaded by the user, and based on the content of the images uploaded by the user. Also, such methods can provide electronic instructions to the computerized electronic image processor hardware device to output the user characteristics on a graphic user interface hardware device.

Exemplary, special-purpose image processor devices herein include specialized image processing circuits and network connections operatively (meaning directly or indirectly) connected to the specialized image processing circuits. The specialized image processing circuits provide electronic instructions to a non-transitory electronic storage hardware device to record images uploaded by a user over a computerized network to a social networking site, and to record categories of network site locations to which the images are uploaded by the user. Also, the specialized image processing circuits analyze features within the images to identify content of each of the images. Thus, the specialized image processing circuits determine the user characteristics based on the categories of network site locations to which the images are uploaded by the user, and based on the content of the images uploaded by the user. The specialized image processing circuits output the user characteristics on a graphic user interface hardware device.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
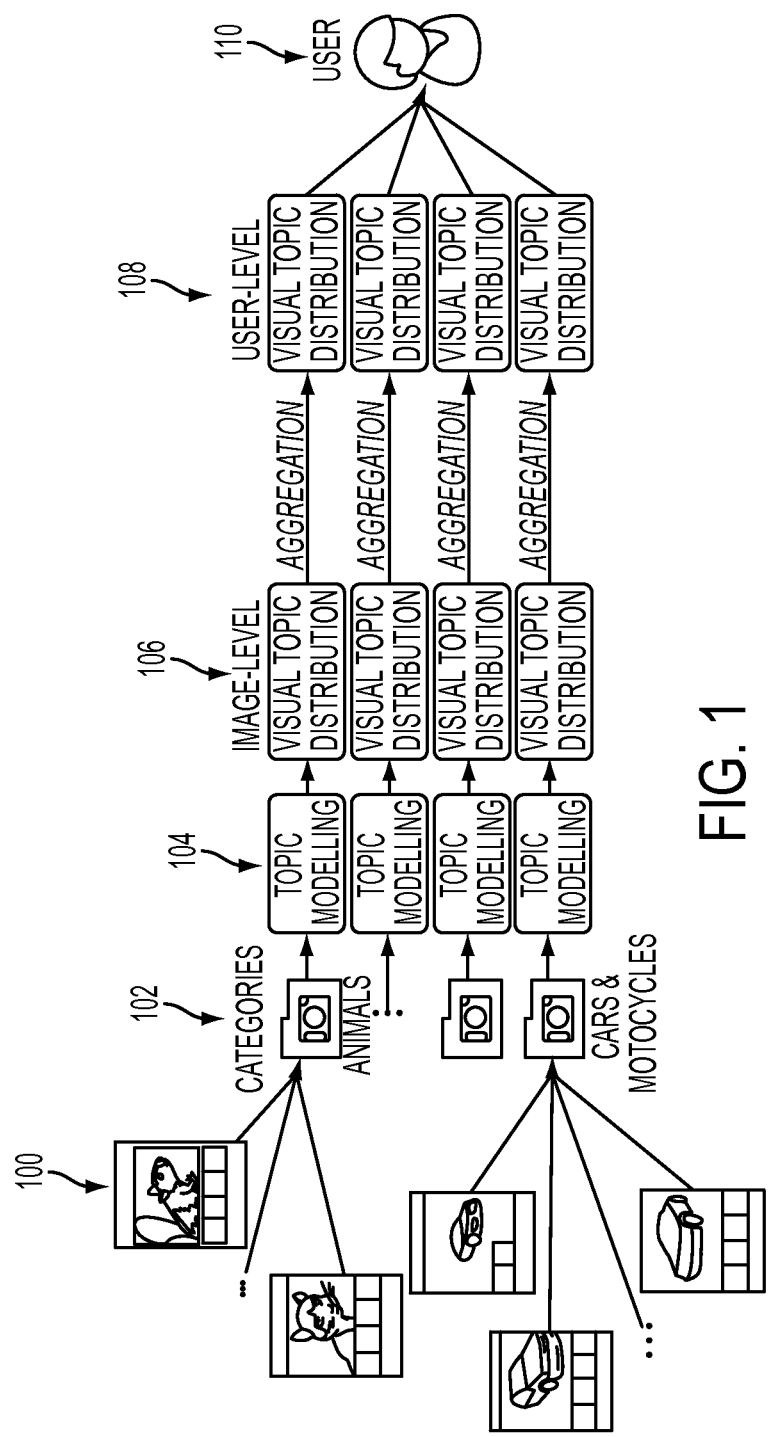
FIG. 1 is a schematic diagram illustrating systems herein.

As mentioned above, recently many social networking cites such as Instagram® and Pinterest® are primarily image based (as opposed by being primarily text based, e.g., Facebook® and Twitter®) and such sites have gained popularity, and such types of sites are referred to herein as "image-based social networking sites" for ease of reference. The ability to predict user characteristics such as age, gender, preferences, political orientation, interests, etc., from their social media activities is useful for personalization and recommender systems. Most of the techniques proposed for this purpose utilize the textual content created by a user.

To the contrary, in this disclosure, the methods and systems herein provide a process to infer a user's characteristics using the images posted by the user on different social networks. Specifically, this disclosure uses the images uploaded or posted (e.g., images pinned) by users on online social network posting locations (e.g., social media boards or pinboards, etc.) to predict their characteristics. The methods and systems herein frame user characteristics classification as a binary classification problem (for example, male and female categories) and evaluate the use of a variety of image-based features.

In particular, the methods and systems herein extract features from users' posting behaviors and posted content. The methods and systems herein utilize the images from users of image-based social networking sites. Even for randomly chosen users, it can be seen that there are differences between male and female users. Male users are more interested in electronics, buildings, men's clothes, and so on. On the other hand, female users are more likely to upload posts that are related to jewelry, women's clothes, gardening, and so on. Based on these findings, for each user, the methods and systems herein extract features from their collections of posts in a few different categories, such as travel, art, and technology.

For posting behaviors, the methods and systems herein mainly focus on the users' own labeled distribution of their collections of posts over the limited number of categories provided by image-based social networking sites. Meanwhile, the methods and systems herein employ visual topic model to obtain user-level visual topic distributions in different categories according to each user's posted images. Therefore, both posting behavior and posted content are used for user characteristics prediction. In particular, visual content provides competitive performance in terms of accuracy.

As noted above, the methods and systems herein frame the task of predicting users' characteristics from their posted images as a binary classification task. Given a set of images posted by a user on a social networking site, the methods and systems herein predict, for example, whether the user is male or female. The methods and systems herein note that males and females differ in terms of their image posting behavior as well as in the content of posted images. The methods and systems herein extract features to capture visual content of images as well as users' posting behavior as described in the following subsections.

With respect to "posting behavior," the methods and systems herein determine user posting behavior based on the types of images users post. Intuitively, images posted by a person are representative of interests and preferences. Often, males and females have inherently different interests and preferences and thus, images posted by them should be indicative of these differences in interests and preferences. For example, females (as a group) may post more images related to fashion, whereas males (as a group) may post more images of bikes and cars. Often, at the time of posting, OSNs offer a medium to users to indicate the board category of the image(s) by means of tags, album names, category labels, etc. The methods and systems herein use these associated tags/category labels of the boards (or other similar social network posting locations) to which the user posts images to determine the posting behavior of users.

Image-based social networking sites allow users to choose a category label from a list of pre-defined labels for each social network posting locations they create. Table I presented below lists the names of some exemplary category labels that could be provided by image-based social networking sites.

TABLE 1

Name of categories included in these users.

| animals | design | gardening | holiday_events | mens_fashion | quotes | travel |
|---|---|---|---|---|---|---|
| architecture | diy_crafts | geek | home_decor | other | science_nature | weddings |
| art | education | hair_beauty | humor | outdoors | sports | womens_fashion |
| cars_motorcycles | film_music_books | health_fitness | illustrations_posters | photography | tattoos | |
| celebrities | food_drink | history | kids | products | | Technology |

The methods and systems herein provide that all the posts (images) in the same social network posting location have the same category label as that of the corresponding social network posting location. Next, for a given user, the methods and systems herein calculate the number of posts in each category of social network posting location, and normalize these numbers to get a distribution of categories (as an element of user posting behavior). This provides a multi-dimensional preference vector for each user giving a category distribution for the images posted by the user, where the number of dimensions of the vector is equal to the number of available categories. The methods and systems herein use the category distribution thus obtained as features, and each feature measures the fraction of images posted by the user in a corresponding category.

With respect to the "visual content of posted images," in order to capture the differences in content of the images posted by males and females, the methods and systems herein use a "bag of visual features" model to represent the visual content of images posted by the users. This bag of visual features model represents an image as a vector of visual features.

In this bag of visual features model, the occurrence count of each visual feature (local image feature) in each image is used to create a bag of visual features vector for the image. While many approaches can be used with methods and systems herein, in one example, the methods and systems herein can employ scale-invariant feature transform (SIFT) to discover local features for each image in the dataset. In such an example, visual features are discovered by clustering all the SIFT features and defining the centre of each cluster as a visual feature. In this way, each image can be represented as the frequencies of the many visual features discovered. Each image posted by a user is thus represented as a vector of visual features.

Next, for a fine-grained analysis, the methods and systems herein can, for example, discover the latent visual topic distribution of each user by employing probabilistic Latent Semantic Analysis (pLSA). In one implementation, the methods and systems herein can learn the visual topics on a per category basis. In this example, the pLSA models the mixture distribution $p(i,v)$ of the image d and visual feature v. By employing an expectation-maximization (EM) process, the model can learn the topic distribution $p\{z\backslash i\}$ of each image. Then, the methods and systems herein aggregate the image-level topic distributions of all the images posted by the same user to obtain the user-level topic distribution.

In one example, the number of visual topics can be set to be a specific number for all the categories. In this example, the methods and systems herein learn a topic distribution for each image in all the categories. For each user, the methods and systems herein aggregate the topic distributions in all different categories and normalize the distribution to obtain the user-level topic distribution in all different categories.

FIG. 1 summarizes the framework of extracting user-level visual topic distributions for different categories of images. For example, FIG. 1 illustrates some images 100 that have been posted to different posting boards having different categories 102. In this example, categories 102 to which some of the images were posted include "animals" and "cars and motorcycles." As noted above, the topic modeling 104 of each image is based upon the category of the posting board to which the images were posted. Therefore, the user posting behavior regarding the category of the posting board to which the user posts images is one factor utilized to determine the user characteristics. Again, item 104 provides a multi-dimensional preference vector for each user giving a category distribution for the images posted by the user, where the number of dimensions of the vector is equal to the number of available categories.

In addition, in item 106, the methods and systems herein utilize image level visual topic distribution to determine the visual content of images posted by the users. As noted above, in item 106, the occurrence count of each visual feature (local image feature) in each image is used to create a vector for the image. Thus, in item 106, the methods and systems herein learn a topic distribution for each image in all the categories. Then, in item 108, the methods and systems herein aggregate the topic distributions in all different categories and normalize the distribution to obtain the user-level topic distribution in all different categories. This allows the methods and systems herein to imply the user characteristics 110.

The systems and method herein aggregate the features from images belonging to each user to define the features for each user. In the systems and method herein implementation, average pooling can be used to define users' topic distribution. The systems and method herein average the topic distribution of all the images of the same user to represent the topic distribution or content distribution of the user. The systems and method herein can also join posting behavior and posting content together to generate features that can be employed to distinguish the characteristics of online users. In one example, the systems and method herein join the posting behavior features and the posting content features and perform simple logistic regression, and other joining methodologies can be used with similar success.

Figure 2:
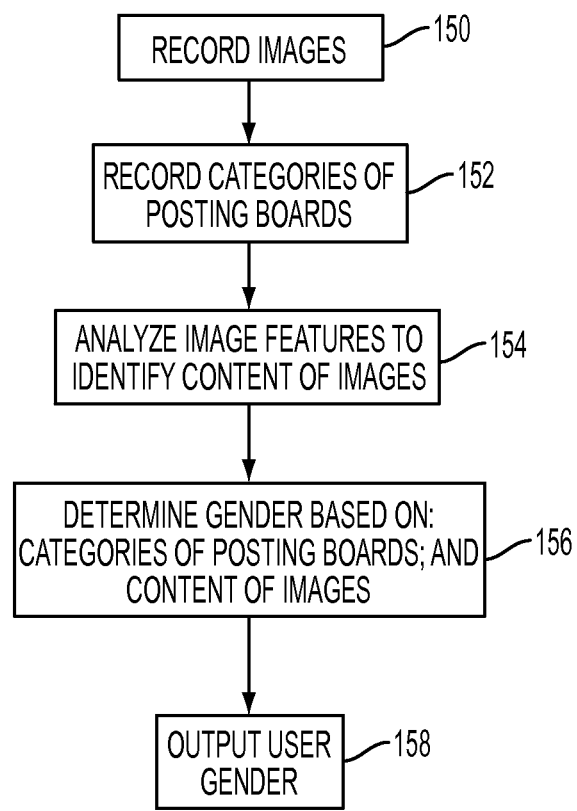
FIG. 2 is a flow diagram of various methods herein.

FIG. 2 is flowchart illustrating exemplary methods herein. In item 150, these methods provide electronic instructions to a non-transitory electronic storage hardware device to automatically record images uploaded by a user over a computerized network to a social networking site, and in item 152 to automatically record categories of network site locations (e.g., posting boards) to which the images are uploaded by the user. For example, these categories can be determined in item 152 based on the categories of the social networking boards to which the user uploads the images.

In item 154, these methods provide electronic instructions to a computerized electronic image processor hardware device to automatically analyze features within the images to identify content of each of the images. Such analyzing of the features within the images (154) generates vectors describing the content of each of the images, and determines the occurrence count of each type of feature in each image to produce such vectors for each image. Thus, the vectors represent the features in the images, and these methods can employ a latent semantic index to discover topics making up a length of each vector. In one example, the analysis of the features within the images determines the visual features for each image by employing scale-invariant feature transform (SIFT) to the images. Also, such analyzing of the features within the images can cluster all such features to define the center of each cluster.

In item 156, these methods provide electronic instructions to the computerized electronic image processor hardware device to automatically determine the user characteristics (e.g., age, gender, preferences, political orientation, interests, etc.) based on the categories of network site locations to which the images are uploaded by the user (from item 152) and on the content of the images uploaded by the user (from item 154).

In other words, using gender as an example, the methods and systems herein look to the category of the social networking board to which images were posted and identify whether males historically predominantly make posts to such a category, or whether females historically predominantly make posts to such a category. Additionally, these methods and systems also automatically identify different features within the images that are posted, and similarly determine whether males or females historically predominantly post images containing such image features. By combining both the determination of whether an image was posted to a predominantly male or female category social networking board, and the determination of whether the image contains features that are predominantly male or female oriented (known based on historical empirical testing) the methods and systems herein provide substantial success in inferring the user characteristics who provided such image posts to the image-based social networking board.

The same processing can be performed to determine age (if younger users typically post to certain board categories, and post images with specific image features vs. older users), to determine preferences (if users with more expensive tastes typically post to certain board categories, and post images with specific image features vs. those users with less-expensive tastes), to determine political orientation (if Republican users typically post to certain board categories, and post images with specific image features vs. Democrat users), to determine age (if younger users typically post to certain board categories, and post images with specific image features vs. older users), to determine interests (if horseback riders typically post to certain board categories, and post images with specific image features vs. non-horseback riders), etc.

Further, such processing does not require the analysis of any text, and can be performed purely upon the image and the category of the social networking board to which the image was posted, which substantially simplifies processing, speeds processing, reduces the amount of computer architecture overhead and storage required, increases transmission rates, etc.

Also, in item 158 such methods provide electronic instructions to the computerized electronic image processor hardware device to automatically output the user characteristics to any other device or, for example, on a graphic user interface hardware device.

The hardware described herein plays a significant part in permitting the foregoing method to be performed, rather than function solely as a mechanism for permitting a solution to be achieved more quickly, (i.e., through the utilization of a computer for performing calculations). For example, these methods allow the user characteristics of an otherwise unknown individual to be inferred or estimated with a high degree of accuracy without analyzing text posts of the user (and by analyzing only the images uploaded by such a user). Therefore, such processes as identifying features within images that are posted on a social networking site board requires the use of a computerized image processor to both access the social networking site posting board and to process the image.

As would be understood by one ordinarily skilled in the art, the processes described herein cannot be performed by human alone (or one operating with a pen and a pad of paper) and instead such processes can only be performed by a machine. Specifically, processes such as automated image feature identification, electronic transmission of data over networks, etc., require the utilization of different specialized machines. Therefore, for example, the recording of posted images and their categories performed by the devices cannot be performed manually (because machines are required to maintain social networking sites and their image posts) and such devices are integral with the processes performed by methods herein. Further, such machine-only processes are not mere "post-solution activity" because the automated analysis of images posted on boards of social networking sites by an image processor is integral with the steps of the processes described herein. Similarly, the electronic transmissions and automated image feature identification utilize special-purpose equipment (telecommunications equipment, routers, switches, etc.) that is distinct from a general-purpose processor. In other words, these various machines are integral with the methods herein because the methods cannot be performed without the machines (and cannot be performed by humans alone).

Additionally, the methods herein solve many highly complex technological problems. For example, the user characteristics of a networked user cannot be known unless the user provides such identification voluntarily, and current systems that inferred user characteristic identification are based solely upon the written words (text) that such a user decides to provide to the social networking sites (and are not capable of inferring user characteristics from image posts). Methods herein solve this technological problem by avoiding the need to analyze the text posts of users, and instead, the methods and systems herein focus upon the images that are uploaded by users. This is especially useful in solving this technological problem because many newer social networking sites are predominately image-based (as opposed to the older text-based sites) which prevents older text-based methodologies of user characteristic identification from being effective on image-based social networking sites. By granting such benefits, the methods herein reduce the amount and complexity of hardware and software needed to be purchased, installed, and maintained by those attempting to identify the user characteristics of social networking site users, thereby solving a substantial technological problem that is experienced today.

Figure 3:
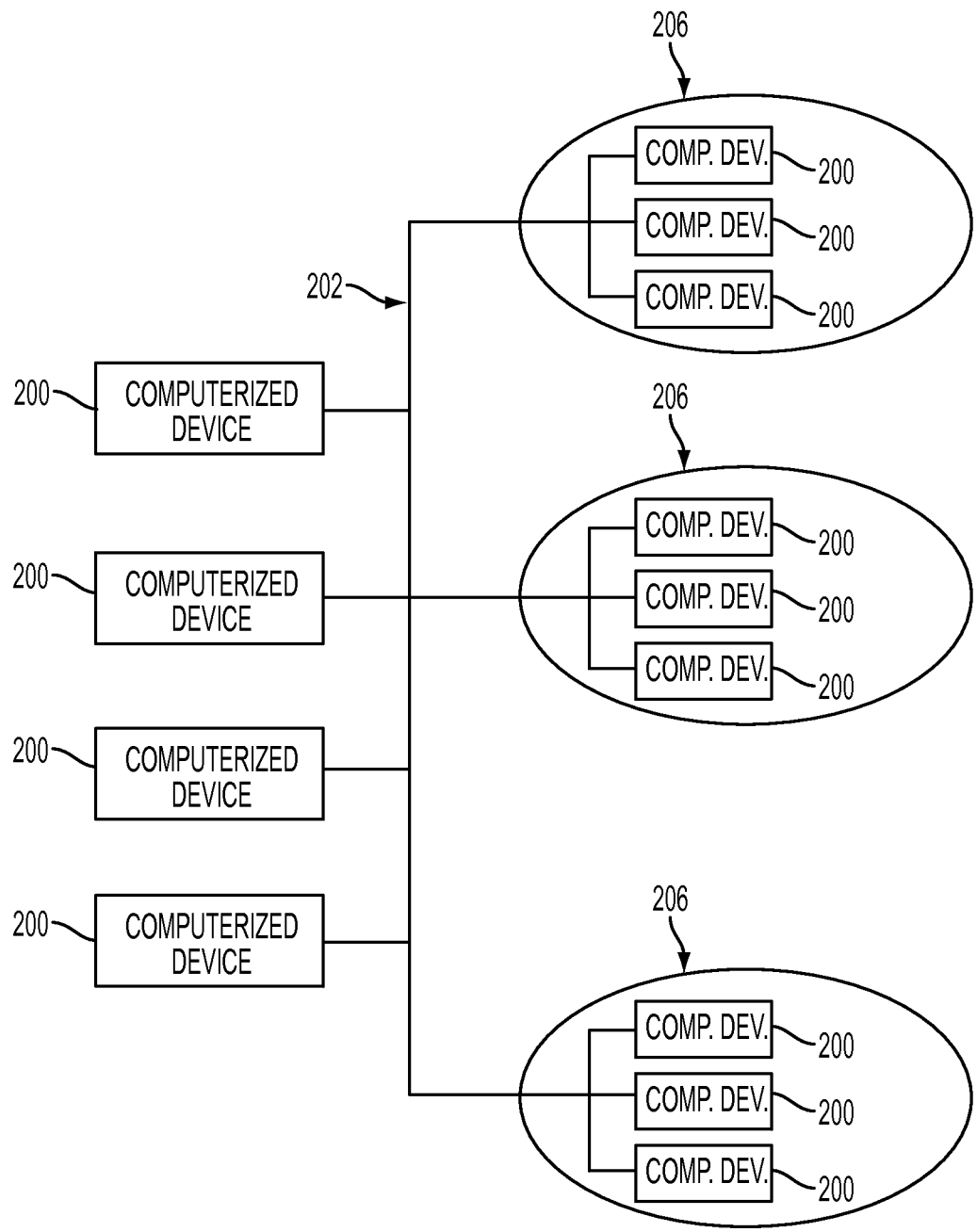
FIG. 3 is a schematic diagram illustrating systems herein.

As shown in FIG. 3, exemplary systems and methods herein include various computerized devices 200 (such as social network servers, image processors, storage devices, etc.) located at various different physical locations 206. The computerized devices 200 can include servers, personal computers, mobile devices, etc., and are in communication (operatively connected to one another) by way of a local or wide area (wired or wireless) network 202, such as the Internet.

Figure 4:
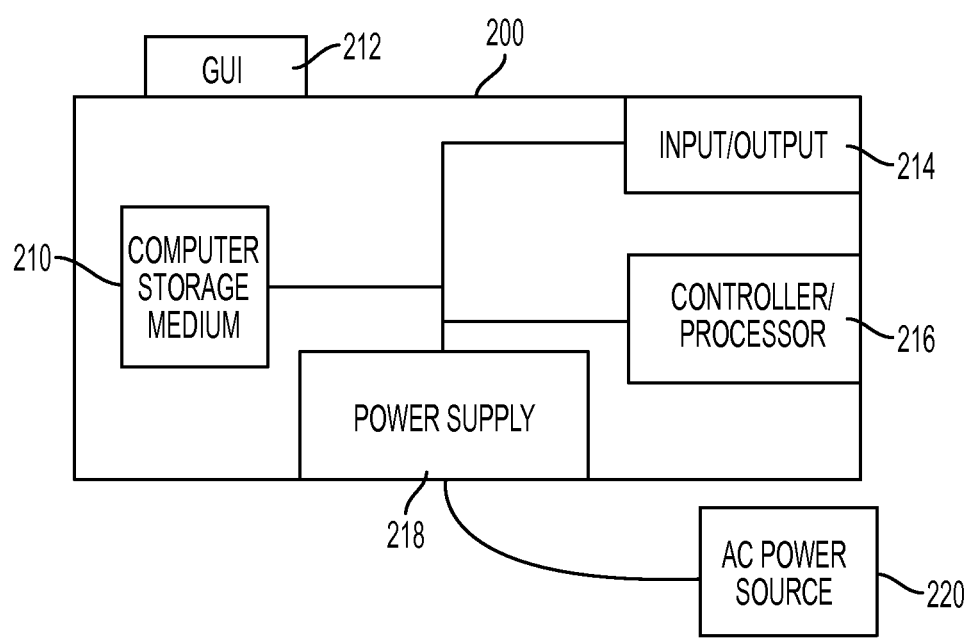
FIG. 4 is a schematic diagram illustrating devices herein.

FIG. 4 illustrates the details of one of such computerized devices 200, that is a special-purpose image processing device, which can be used with systems and methods herein. Such image processing devices 200 are special-purpose devices distinguished from general-purpose computers because such devices include specialized hardware, such as: specialized image processors 216 (e.g., containing specialized filters, buffers, application specific integrated circuits (ASICs), ports, etc.) that are specialized for processing images, etc.

The special-purpose image processing device 200 includes a controller/tangible processor 216 and a communications port (input/output) 214 operatively connected to the tangible processor 216 and to the computerized network 202 external to the special-purpose image processing device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the special-purpose image processing device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 4, a body housing has one or more functional components that operate on power supplied from an alternating current (AC) source 220 by the power supply 218. The power supply 218 can comprise a common power conversion unit, power storage element (e.g., a battery, etc), etc.

Therefore, exemplary, special-purpose image processor devices 200 herein include specialized image processing circuits 216 and network connections 214 operatively (meaning directly or indirectly) connected to the specialized image processing circuits 216. The specialized image processing circuits 216 provide electronic instructions to a non-transitory electronic storage hardware device 210 to record images uploaded by a user over a computerized network 202 to a social networking site 200, and to record categories of network site locations 200 to which the images are uploaded by the user. Also, the specialized image processing circuits 216 analyze features within the images to identify content of each of the images. Thus, the specialized image processing circuits 216 determine the user characteristics based on the categories of network site locations to which the images are uploaded by the user, and based on the content of the images uploaded by the user. The specialized image processing circuits 216 output the user characteristics on a graphic user interface hardware device 212.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicant does not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    recording images uploaded by a user to a social networking site;
    recording categories of social networking boards to which said images are uploaded by said user to identify user image board posting behavior;
    analyzing features within said images using automated image feature identification to identify user image posted content of each of said images; and
    determining user characteristics of said user based only on said user image board posting behavior and said user image posted content.

2. The method according to claim 1, said analyzing said features within said images generating vectors describing said user image posted content.

3. The method according to claim 1, said analyzing said features within said images determining an occurrence count of each type of feature in each said image to produce a vector of each said image.

4. The method according to claim 3, said analyzing said features within said images determining vectors representing said features,
    said method further comprising employing a latent semantic index to discover topics making up a length of each said vector.

5. The method according to claim 1, said user characteristics comprising at least one of age, gender, preferences, political orientation, and interests.

6. The method according to claim 1, further comprising identifying said features in said images by employing scale-invariant feature transform (SIFT) to said images.

7. A method comprising:
    providing electronic instructions to a non-transitory electronic storage hardware device to record images uploaded by a user over a computerized network to a social networking site;
    providing electronic instructions to said non-transitory electronic storage hardware device to record categories of social networking boards to which said images are uploaded by said user to identify user image board posting behavior;
    providing electronic instructions to a computerized electronic image processor hardware device to analyze features within said images using automated image feature identification to identify user image posted content of each of said images;
    providing electronic instructions to said computerized electronic image processor hardware device to determine user characteristics of said user based only on said user image board posting behavior and said user image posted content; and
    providing electronic instructions to said computerized electronic image processor hardware device to output said user characteristics of said user on a graphic user interface hardware device.

8. The method according to claim 7, said computerized electronic image processor hardware device analyzing said features within said images by generating vectors describing said user image posted content.

9. The method according to claim 7, said computerized electronic image processor hardware device analyzing said features within said images by determining an occurrence count of each type of feature in each said image to produce a vector of each said image.

10. The method according to claim 9, said computerized electronic image processor hardware device analyzing said features within said images by determining vectors representing said features,
    said method further comprising employing a latent semantic index to discover topics making up a length of each said vector.

11. The method according to claim 7, said user characteristics comprising at least one of age, gender, preferences, political orientation, and interests.

12. The method according to claim 7, further comprising said computerized electronic image processor hardware device identifying said features in said images by employing scale-invariant feature transform (SIFT) to said images.

13. An image processor device comprising:
    specialized image processing circuits; and
    network connections operatively connected to said specialized image processing circuits,
    said specialized image processing circuits providing electronic instructions to a non-transitory electronic storage hardware device to record images uploaded by a user over a computerized network to a social networking site;
    said specialized image processing circuits providing electronic instructions to said non-transitory electronic storage hardware device to record categories of social networking boards to which said images are uploaded by said user to identify user image board posting behavior;
    said specialized image processing circuits analyzing features within said images using automated image feature identification to identify user image posted content of each of said images;
    said specialized image processing circuits determining user characteristics of said user based only on said user image board posting behavior and said user image posted content; and
    said specialized image processing circuits outputting said user characteristics of said user on a graphic user interface hardware device.

14. The image processor device according to claim 13, said analyzing said features within said images generating vectors describing said user image posted content.

15. The image processor device according to claim 13, said analyzing said features within said images determining an occurrence count of each type of feature in each said image to produce a vector of each said image.

16. The image processor device according to claim 15, said analyzing said features within said images determining vectors representing said features,
   said image processor device further comprising employing a latent semantic index to discover topics making up a length of each said vector.

17. The image processor device according to claim 13, said user characteristics comprising at least one of age, gender, preferences, political orientation, and interests.

18. The image processor device according to claim 13, further comprising identifying said features in said images by employing scale-invariant feature transform (SIFT) to said images.

* * * * *